US012144006B2

(12) United States Patent
Tränk et al.

(10) Patent No.: US 12,144,006 B2
(45) Date of Patent: Nov. 12, 2024

(54) ISOLATED E-UTRAN OPERATIONS FOR PUBLIC SAFETY (IOPS) AWARENESS WITH MULTIMEDIA BROADCAST MULTICAST SERVICES (MBMS)

(71) Applicant: Telefonaktiebolaget LM Ericsson (publ), Stockholm (SE)

(72) Inventors: Magnus Tränk, Lerum (SE); Joakim Åkesson, Landvetter (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 513 days.

(21) Appl. No.: 17/283,808

(22) PCT Filed: Oct. 3, 2019

(86) PCT No.: PCT/EP2019/076849
§ 371 (c)(1),
(2) Date: Apr. 8, 2021

(87) PCT Pub. No.: WO2020/074368
PCT Pub. Date: Apr. 16, 2020

(65) Prior Publication Data
US 2022/0007332 A1   Jan. 6, 2022

Related U.S. Application Data

(60) Provisional application No. 62/742,628, filed on Oct. 8, 2018.

(51) Int. Cl.
*H04L 12/28* (2006.01)
*H04L 41/12* (2022.01)
(Continued)

(52) U.S. Cl.
CPC ............. *H04W 72/30* (2023.01); *H04L 41/12* (2013.01); *H04W 48/10* (2013.01); *H04W 76/40* (2018.02)

(58) Field of Classification Search
CPC ..... H04W 72/30; H04W 48/10; H04W 76/40; H04W 4/14; H04W 48/18; H04W 24/02;
(Continued)

(56) References Cited

U.S. PATENT DOCUMENTS 10,694,404 B2 * 6/2020 Chandramouli ...... H04W 48/12
2016/0277987 A1   9/2016 Chen et al.
(Continued)

FOREIGN PATENT DOCUMENTS

CN   106341808 A   1/2017
CN   107277131 A   10/2017
(Continued)

OTHER PUBLICATIONS

Xihua Fu, ZTE Corporation, "SDN Application for Transport Network", ITU-T draft Jan. 29, 2013, pp. 1-5, International Telecommunication Union (Year: 2013).*
(Continued)

*Primary Examiner* — Chuong T Ho
(74) *Attorney, Agent, or Firm* — Sage Patent Group

(57) ABSTRACT

Disclosed herein is a method for reporting existence of an isolated radio access network and a wireless device and a radio base station for performing the method. The method comprises: performing communications in an isolated radio access network, the isolated radio access network being a radio access network provided by one or more first radio base stations that do not have connectivity to a centralized core network of a cellular communications network; attaching to a second radio base station, the second radio base station having connectivity to the core network; and providing, to a centralized communications server via the second radio base station, one or more messages that inform the centralized communications server of the existence of the isolated radio access network.

27 Claims, 6 Drawing Sheets

(51) Int. Cl.
*H04W 48/10* (2009.01)
*H04W 72/30* (2023.01)
*H04W 76/40* (2018.01)

(58) Field of Classification Search
CPC ......... H04W 4/06; H04W 4/90; H04W 24/10; H04W 4/08; H04L 41/12; H04L 65/611
USPC .................................... 370/254, 253, 252
See application file for complete search history.

(56) References Cited

U.S. PATENT DOCUMENTS

| | | | |
|---|---|---|---|
| 2017/0006536 A1* | 1/2017 | Baek ..................... | H04W 12/06 |
| 2017/0134973 A1 | 5/2017 | Byun et al. | |
| 2017/0188325 A1* | 6/2017 | Tsai ..................... | H04W 12/033 |
| 2018/0007571 A1* | 1/2018 | Chandramouli ...... | H04W 48/12 |
| 2018/0020399 A1* | 1/2018 | Ke ......................... | H04W 48/12 |
| 2018/0098290 A1* | 4/2018 | Yu ......................... | H04W 52/241 |
| 2018/0295671 A1* | 10/2018 | Kim ....................... | H04W 8/26 |
| 2020/0125389 A1* | 4/2020 | Palermo .............. | H04W 28/084 |
| 2022/0086864 A1* | 3/2022 | Sabella ............... | H04W 72/535 |

FOREIGN PATENT DOCUMENTS

| | | |
|---|---|---|
| EP | 3113547 A1 | 1/2017 |
| WO | 2016117505 A1 | 7/2016 |
| WO | 2016122224 A1 | 8/2016 |
| WO | 2017031743 A1 | 3/2017 |

OTHER PUBLICATIONS

Blackberry UK Limited, "S6-171152: Migration concerns," 3GPP TSG-SA WG6 Meeting #19, Oct. 9-13, 2017, Dubrovnik, Croatia, 16 pages.

Ericsson, "S6-181254: Functional model and procedure for switching between primary and IOPS MC system," 3GPP TSG-SA WG6 Meeting #25, Jul. 23-27, 2018, Sophia Antipolis, France, 7 pages.

Ericsson, "S6-181320: Pseudo-CR on Solution for IOPS notification to MC users," 3GPP TSG-SA WG6 Meeting #26, Oct. 15-19, 2018, Vilnius, Lithuania, 3 pages.

Examination Report for European Patent Application No. 19783493.0, mailed Jan. 14, 2022, 8 pages.

Notice of Reasons for Rejection for Japanese Patent Application No. 2021-518957, mailed Jul. 26, 2022, 11 pages.

Author Unknown, "Technical Specification Group Services and System Aspects; Study on MC services access aspects (Release 16)," Technical Report 23.778, Version 0.4.0, 3GPP Organizational Partners, Jul. 2018, 20 pages.

Author Unknown, "Technical Specification Group Services and System Aspects; Study on MC services access aspects (Release 16)," Technical Report 23.778, Version 1.2.0, 3GPP Organizational Partners, Mar. 2019, 25 pages.

Author Unknown, "Technical Specification Group Services and System Aspects; Common functional architecture to support mission critical services; Stage 2 (Release 15)," Technical Specification 23.280, Version 15.2.0, 3GPP Organizational Partners, Jan. 2018, 191 pages.

Author Unknown, "Technical Specification Group Services and System Aspects; General Packet Radio Service (GPRS) enhancements for Evolved Universal Terrestrial Radio Access Network (E-UTRAN) access (Release 15)," Technical Specification 23.401, Version 15.1.0, 3GPP Organizational Partners, Sep. 2017, 397 pages.

Author Unknown, "Technical Specification Group Services and System Aspects; General Packet Radio Service (GPRS) enhancements for Evolved Universal Terrestrial Radio Access Network (E-UTRAN) access (Release 15)," Technical Specification 23.401, Version 15.5.0, 3GPP Organizational Partners, Sep. 2018, 410 pages.

International Search Report and Written Opinion for International Patent Application No. PCT/EP2019/076849, mailed Dec. 16, 2019, 16 pages.

First Office Action for Chinese Patent Application No. 2019800662949, mailed Oct. 27, 2021, 12 pages.

* cited by examiner

ISOLATED E-UTRAN OPERATIONS FOR PUBLIC SAFETY (IOPS) AWARENESS WITH MULTIMEDIA BROADCAST MULTICAST SERVICES (MBMS)

This application is a 35 U.S.C. § 371 national phase filing of International Application No. PCT/EP2019/076849, filed Oct. 3, 2019, which claims the benefit of U.S. Provisional Application No. 62/742,628, filed Oct. 8, 2018, the disclosures of which are incorporated herein by reference in their entireties.

TECHNICAL FIELD

The present disclosure relates generally to communications, and more particularly, to Group Communication (GC) communication services and related wireless devices and network nodes and similar.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Mission Critical (MC) communication services are essential for the work performed by public safety users, e.g. police and fire brigade. The MC communications service requires preferential handling compared to normal telecommunication services including handling of prioritized MC calls for emergency and imminent threats. Furthermore, the MC communication service requires several resilience features that provide a guaranteed service level even if part of the network or backhaul infrastructure fails.

The most commonly used communication method for public safety users is Group Communication (GC), which requires that the same information is delivered to multiple users. One type of GC is the Push to Talk (PTT) service. A GC system can be designed with a centralized architecture approach, in which a centralized GC control node provides full control of all group data, e.g. group membership, policies, user authorities, and prioritizations. Such an approach requires a network infrastructure that provides high network availability. This type of operation is sometimes known as Trunked Mode Operation (TMO) or on-network operation.

A contrary approach is a design where each user radio device is controlling the GC. In this case the group data (which is similar to but normally a subset of the group data as listed in the previous paragraph) must be pre-provisioned to each device. This type of solution is sometimes known as Direct Mode Operation (DMO) or off-network operation, which means that the GC can take place without any support from the network infrastructure.

In an incumbent GC system, both approaches mentioned above are supported. Furthermore, the incumbent GC system may provide a resilience feature that allows the local radio base station to provide local connectivity and GC to the user within the coverage of the radio base station even if the local radio base station loses it connections to other parts of the network. This is in some deployment known as Local Site Trunking.

In a Third Generation Partnership Project (3GPP) based network that provides GC services like Mission Critical Push to Talk (MCPTT), the service can be guaranteed even in the case of backhaul failure by using the feature known as Isolated Evolved Universal Terrestrial Radio Access Network (E-UTRAN) Operations for Public Safety (IOPS), with reference to 3GPP Technical Specification (TS) 23.401 V15.1.0 and Annex K. The IOPS functionality provides local connectivity to the public safety users' devices that are within the communication range of the E-UTRAN radio base station (enhanced or evolved Node B (eNB)) that supports IOPS.

Furthermore, GC can be provided by utilizing a different transmission mode. One important aspect in GC is that the same information is delivered to multiple users. These users may be located at different locations. If many users are located within the same area, multicast or broadcast based transmission using, e.g., Multicast-Broadcast Multimedia Services (MBMS) is efficient. MBMS can be used in a transmission mode known as Multimedia Broadcast Multicast Service Single Frequency Network (MBSFN). In MBSFN transmission, there are several radio cells that transmit the same signal synchronously on the same frequency, which gives an improved Signal to Interference plus Noise Ratio (SINR), thanks to multiple transmissions added to a combined signal power and also considerable interference reductions for the wireless device.

SUMMARY

There currently exist certain challenge(s). In a radio network that provides group communication using MBMS (in MBSFN transmission mode), the quality of service level is dependent on a stable set of radio base stations that all contribute to the radio signal. The resilience feature IOPS causes radio performance challenges in different aspects:
 1. One cell in IOPS mode is unknown to the rest of the network and is unable to contribute to the MBSFN with the result that the MBMS quality is degraded outside the IOPS node.
 2. A cell in IOPS mode and the neighboring cells not in IOPS mode will cause radio interference.
 3. One cell in IOPS mode may cause an unpredictable GC experience when a wireless device is switching from the cell in IOPS mode and the neighboring cells that are not in IOPS and vice versa. When the wireless device is attached to the cell in IOPS mode it can only communicate with other wireless devices that are attached to the same cell.

Certain aspects of the present disclosure and their embodiments may provide solutions to the aforementioned or other challenges. Embodiments of the proposed solution provide a method for wireless devices to report, to a central GC control node, the presence of an IOPS cell after the wireless device at least temporarily has moved from the IOPS cell into the radio network area outside the IOPS cell. The GC control node may use this report to take actions to improve the MBMS quality and/or to inform other User Equipments (UEs) in the area about the proximity of a cell in IOPS mode.

In some embodiments, the information sent to other UEs in the proximity of the cell in IOPS mode may include the Public Land Mobile Network (PLMN) Identifier (ID) of the IOPS, which can, e.g., improve the handover time to the IOPS cell.

Embodiments of the present disclosure inform wireless devices that are close to a radio base station in IOPS mode about details on how to access the local GC server and about the group constellation in the local GC server. This information is collected by a wireless device that has previously been in a radio base station in IOPS mode and sent to all UEs that are close to the radio base station in IOPS mode.

There are, proposed herein, various embodiments which address one or more of the issues disclosed herein.

Certain embodiments may provide one or more of the following technical advantage(s). Embodiments of the present disclosure improve the quality of services for wireless devices that are attached to a cell in IOPS mode or in proximity of the cell in IOPS mode. Furthermore, the embodiments of the present disclosure can be used to inform all wireless devices of the proximity of an IOPS enabled cell. This information may include details (e.g., PLMN ID) that improve the handover time when a wireless device moves into the cell in IOPS mode. Furthermore, this provides advantages to the GC users (i.e., the wireless devices (e.g., UEs) using the GC service), who become aware of the reduced GC coverage due to the proximity of an IOPS enabled cell.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings.

DETAILED DESCRIPTION

Figure 1:
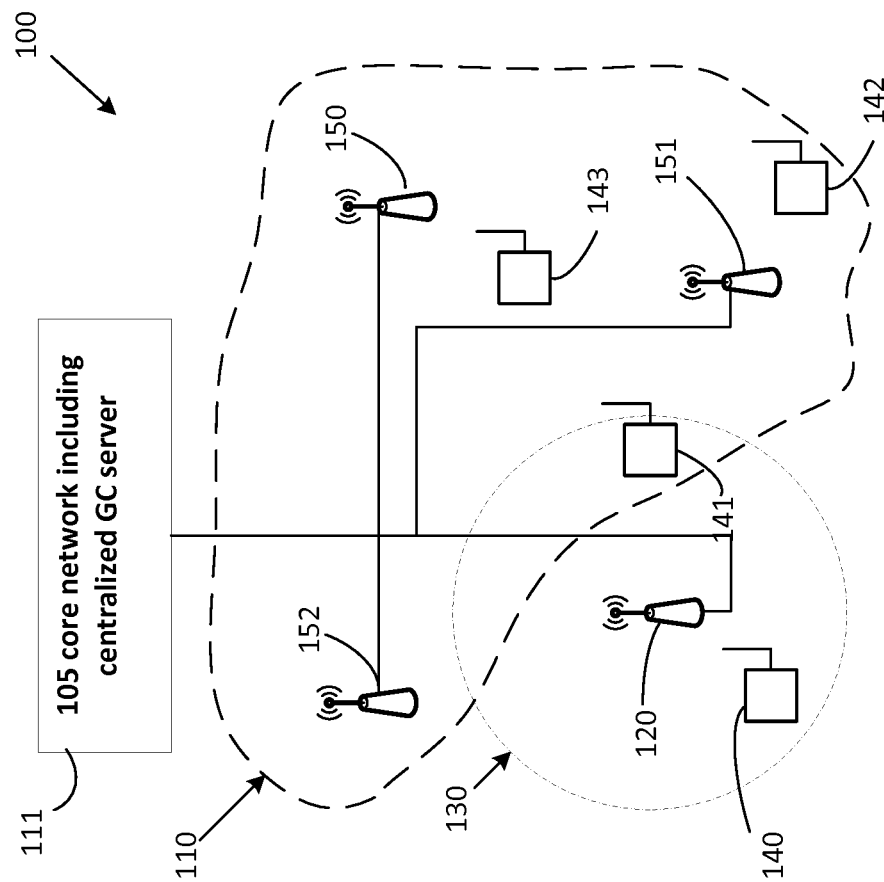
FIG. 1 is a network diagram of an example cellular communications network 100 that illustrates embodiments of the present disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Additional information may also be found in the document(s) provided in the Appendix.]

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an eNB in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a UE in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

Particularly for Public Safety users, a radio base station resilience feature known as IOPS is important. IOPS is specified in 3GPP TS 23.401 V15.1.0 Annex K. The IOPS feature can provide local connectivity to UEs in the case when there is a link failure to the core network. The IOPS feature can be used in different types of deployments. One common scenario is when radio base station is located on a remote location (e.g., an island) and the radio base station is connected to the core network via, e.g., a microwave link. If there is a microwave link failure, it is critical for Public Safety users to be able to at least have local connectivity for the communication between the users in the coverage of the radio base station.

It should be noted that while the example embodiments described herein relate to group communications, the embodiments described herein are not limited to group communications and can be used for other types of communications. Further, while the example embodiments refer to an isolated cell and an isolated radio base station, the embodiments described herein are equally applicable to an isolated radio access network including one or more isolated cells (e.g., on or more IOPS cells) provided by one or more isolated radio base stations.

FIG. 1 is a network diagram of an example cellular communications network 100 that illustrates embodiments of the present disclosure. The cellular communications network 100 includes a core network 105 including a centralized GC server and four radio base stations 120, 150, 151, and 152. In 3GPP LTE, the radio base stations 120, 15, 151, and 152 can be eNBs. In 3GPP NR, the radio base stations 120, 150, 151, and 152 can be gNBs. In this example, the radio base station 120 has lost its connection to the centralized core network and centralized GC server, and is therefore currently working in IOPS mode. The radio base station 120 has a corresponding coverage area 130, which is also referred to herein as an IOPS cell 130. The other radio base stations 150, 151, and 152 are connected to the centralized core network and the centralized GC server and, as such, are considered part of a respective PLMN 111 (i.e., the complete PLMN of the primary/macro network). The radio base stations 150, 151, and 152 have a combined coverage area 110, which is also referred to herein as a coverage area 110 of the PLMN 111.

In GC, the radio base stations 120, 150, 151, and 152 typically utilize MBMS. Further, in order to provide good SINR, the radio base stations 120, 150, 151, and 152 are coordinated in an MBSFN. If one of the radio base stations 120, 150, 151, and 152, which in this example is the radio base station 120, operates in IOPS mode and therefore does not contribute to the coordinated MBSFN transmission, then this radio base station 120 will have a negative impact on the SINR for the MBSFN generated by the remaining radio base stations 150, 151, and 152.

FIG. 1 also illustrates four wireless devices 140, 141, 142, and 143 (e.g., UEs) in different locations. The wireless device 140 is located in the coverage area 130 of the of the radio base station 120 operating in IOPS mode and does not have access to the centralized GC server. The wireless devices 142 and 143 are located in the coverage area 110 of the radio base stations 150, 151, and 152 and thus within the coverage of the PLMN 111 and connected to the centralized GC server. The wireless device 141 is located near the border between the coverage area 130 of the radio base station 120 operating in IOPS mode and the coverage area 110 of the PLMN 111 (i.e., the wireless device 141 is within a region that is both within the coverage area of the radio base station 120 in IOPS mode and the coverage area 110 of the PLMN 111); therefore, the wireless device 141 has access either to the local or centralized GC server depending on the current radio conditions. This situation will lead to the wireless devices 140, 141, 142, and 143 experiencing different group constellations depending on where the wireless devices 140, 141, 142, and 143 are located.

Figure 2:
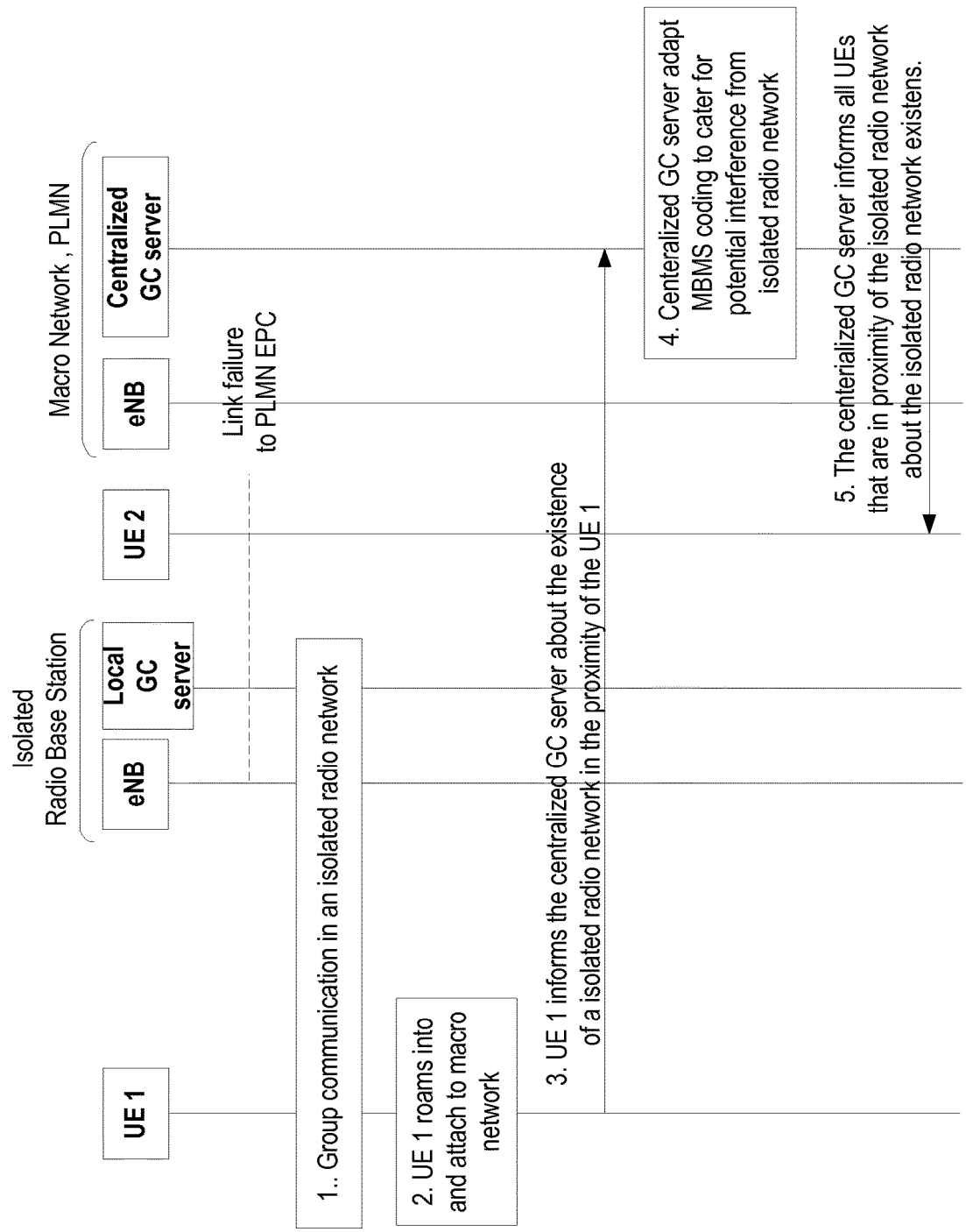
FIG. 2 illustrates a method according to an embodiment of the present solution.

FIG. 2 illustrates a method that is performed by a wireless device (denoted in FIG. 2 as UE1) (e.g., the wireless device 141 of FIG. 1) and the local and centralized GC servers to make the radio network more stable when one (or more) of the radio base stations (e.g., the radio base station 120 of FIG. 1) operates in IOPS mode and/or to inform the other wireless devices (denoted in FIG. 2 as UE2) (e.g., wireless devices 142 and 143) about the IOPS cell and current group constellation dynamics.

While the cellular communications network 100 of FIG. 1 is an example, the method of FIG. 2 applies to any wireless network with several radio base stations in which at least one of the radio base stations operates in IOPS mode. A wireless device (UE1 in the example of FIG. 2) utilizes the GC service from the radio base station in IOPS mode.

This solution in FIG. 2 addresses the issue of how to optimize the user experience when mission critical (MC) wireless devices (e.g. GC UEs) are switching to and from an IOPS GC system (e.g. an Isolated Radio Base Station). An IOPS GC system does not have any connectivity to the primary GC system (e.g. a centralized GC server) and can by that not inform users that are not in the coverage of the IOPS system or even other GC system about the existence of the IOPS GC system. Since GC users (e.g. UE1) are moving around and may enter or leave the IOPS system, the user experience will be unpredictable in terms of group constellations and delays during the switching time from the primary GC system served by one PLMN id to the IOPS GC system served by another PLMN id.

The procedure defined in this solution provides a notification to users that are likely to enter the IOPS GC system, which can improve the switching time and also give an indication to the user that the current active users in a group is impacted by the presence of the local IOPS GC system. A precondition is that there is an IOPS GC system active and that the neighboring cells to the IOPS GC system is part of the primary GC system.

The method of FIG. 2 includes the following steps:

Step 1: UE1 (e.g. a MC service client) is currently located in the coverage of the radio base station in IOPS mode and GC can be performed with other wireless devices that are also connected to the same local GC server. In other words, GC for the UE1 is handled by the IOPS GC system.

Step 2: UE1 roams in the network and attaches to a new radio base station that is connected to the centralized GC server. In other words, UE1 moves out of the coverage of the IOPS GC system and enters the primary GC system.

Step 3: UE1 sends a message(s) to the centralized GC server to inform the centralized GC server about the existence of an isolated radio base station that is operating in IOPS mode. In other words, UE1 sends a message to the primary GC system to inform the primary GC system about the existence of the IOPS GC system in the area. This message(s) can also include information regarding the particular radio access node operating in IOPS mode such as, e.g., details on how to connect to the radio base station that is operating in IOPS mode and/or the local GC server (e.g., PLMN ID, frequency band, and/or GC server address). The message(s) may also include information about group members that are/were present in the isolated network (e.g., other wireless devices that are or at least were present in the IOPS cell), groups supported by the radio base station operating in IOPS mode, and/or active calls. The message(s) can also include information such as, e.g., a cell ID and/or physical location of the IOPS cell or IOPS network.

Step 4 (optional): The centralized GC server performs one or more actions based on the message received from UE1 such as, e.g., one or more actions to improve the quality of service for the GC (e.g., by changing the modulation and coding scheme in the MBSFN) due to the probability of a degraded SINR due to the existence of the isolated radio base station in the proximity. For example, the primary GC server may use the received information to take measures to optimize the provided GC service based on the changed conditions.

Step 5 (optional): The centralized GC server sends a message(s) to all wireless devices in the same geographical area (e.g., UE2). In other words, the primary GC system sends a message to all UEs (e.g. MC service clients) in proximity of the IOPS GC system to notify of the existence of a system. The message(s) contains information on how to connect to the IOPS system (e.g., PLMN ID of the IOPS system, frequency band, and/or the like) in proximity, which will improve the time it takes for the wireless devices (e.g., UE2) to switch to the IOPS network (e.g., handover to the IOPS cell). Furthermore, this message(s) may additionally or alternatively include information about current group constellation, such as current active group member list.

While not illustrated in FIG. 2, after receiving the message(s) from the centralized GC server, UE2 may perform an action(s) based on the information included in the message(s). For example, upon moving out of the coverage area of the PLMN, UE2 may attach to the isolated radio base station 120, e.g., based on at least some of the information included in the message(s) (e.g., PLMN ID, frequency band of operation) and perform GC via the local GC server hosted by the isolated radio base station 120.

The method in FIG. 2 presents a solution for discovering that there is an active IOPS system operational. Based on this both the centralized GC service server and the wireless devices (e.g. GC service clients) may take measures to provide a better user experience for users and better system performance. With knowledge of the IOPS situation and key parameters clients can make better mobility decisions between the centralized system and the IOPS system.

Figure 3:
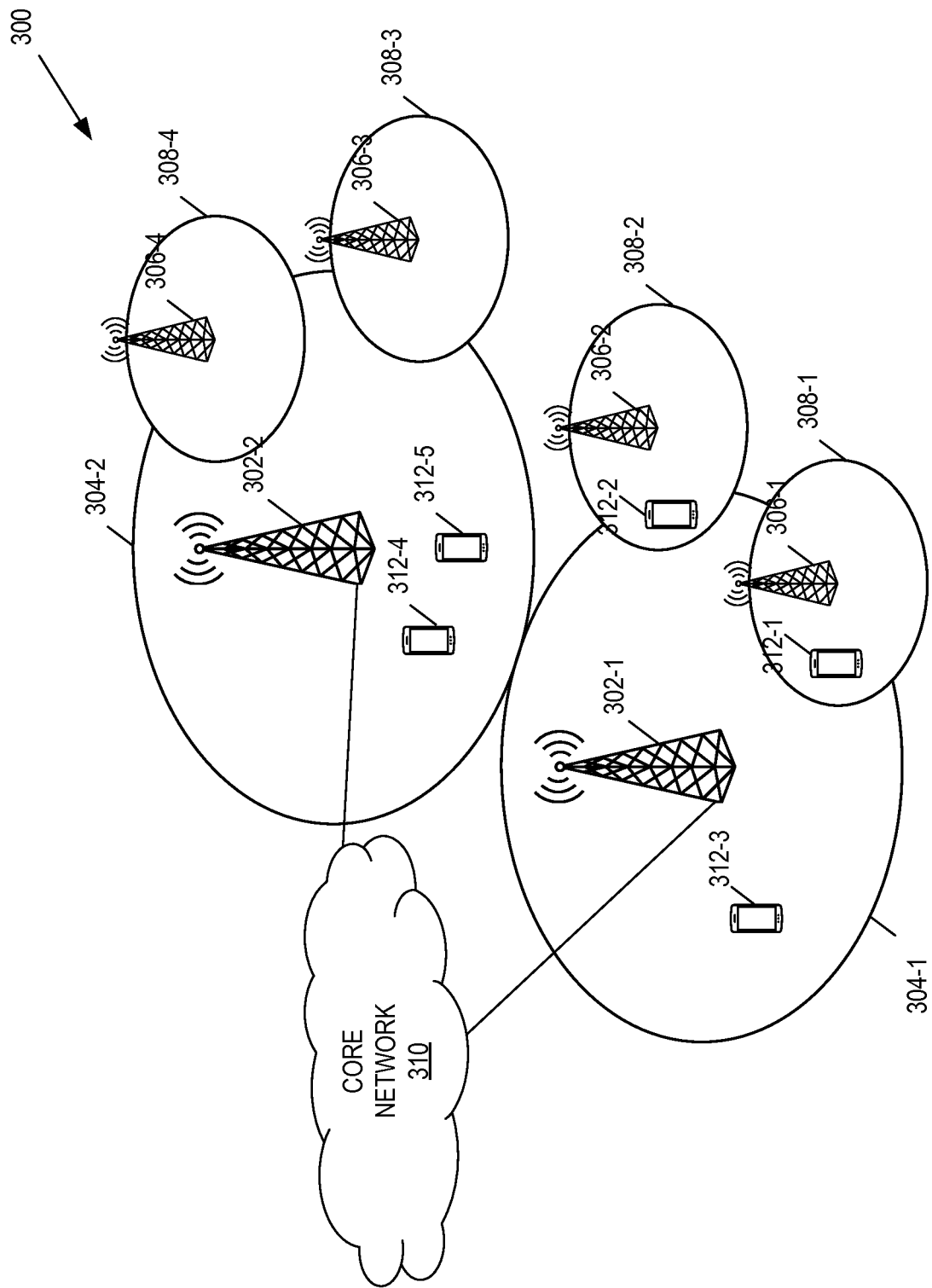
FIG. 3 illustrates one example of a cellular communications network 300 in which embodiments of the present disclosure may be implemented.

FIG. 3 illustrates one example of a cellular communications network 300 in which embodiments of the present disclosure may be implemented. In the embodiments described herein, the cellular communications network 300 is a 5G NR network. In this example, the cellular communications network 300 includes base stations 302-1 and 302-2, which in LTE are referred to as eNBs and in 5G NR are referred to as gNBs, controlling corresponding macro cells 304-1 and 304-2. The base stations 302-1 and 302-2 are generally referred to herein collectively as base stations 302 and individually as base station 302. Likewise, the macro cells 304-1 and 304-2 are generally referred to herein collectively as macro cells 304 and individually as macro cell 304. The cellular communications network 300 may also include a number of low power nodes 306-1 through 306-4 controlling corresponding small cells 308-1 through 308-4. The low power nodes 306-1 through 306-4 can be small base stations (such as pico or femto base stations) or Remote Radio Heads (RRHs), or the like. Notably, while not illustrated, one or more of the small cells 308-1 through 308-4 may alternatively be provided by the base stations 302. The low power nodes 306-1 through 306-4 are generally referred to herein collectively as low power nodes 306 and individually as low power node 306. Likewise, the small cells 308-1 through 308-4 are generally referred to herein collectively as small cells 308 and individually as small cell 308. The base stations 302 (and optionally the low power nodes 306) are connected to a core network 310.

The base stations 302 and the low power nodes 306 provide service to wireless devices 312-1 through 312-5 in the corresponding cells 304 and 308. The wireless devices 312-1 through 312-5 are generally referred to herein collectively as wireless devices 312 and individually as wireless device 312. The wireless devices 312 are also sometimes referred to herein as UEs.

Figure 4:
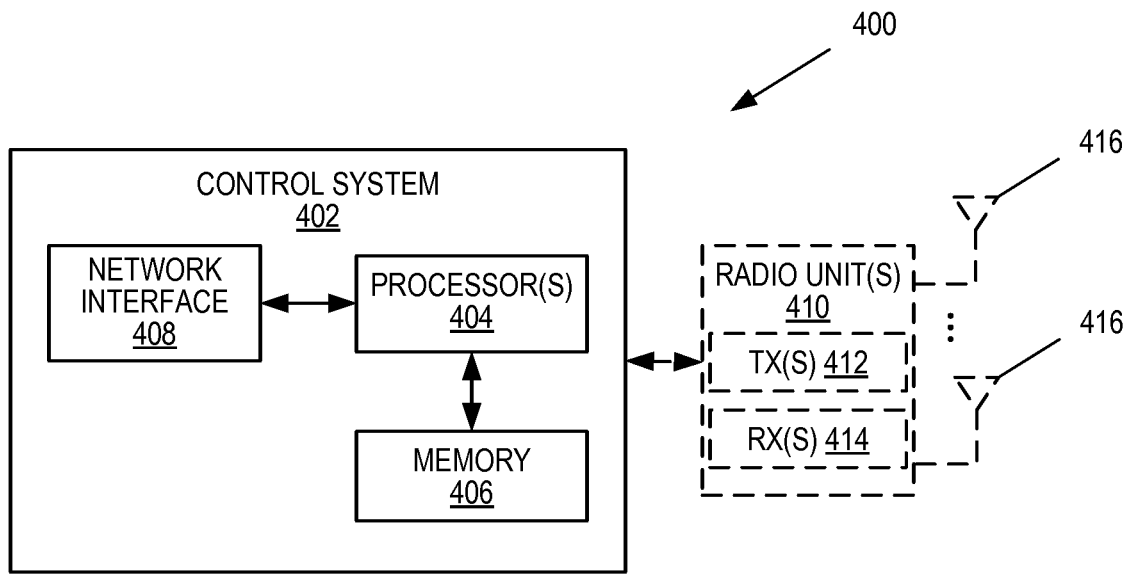
FIG. 4 is a schematic block diagram of a network node according to some embodiments of the present disclosure.

FIG. 4 is a schematic block diagram of a network node 400 according to some embodiments of the present disclosure. The network node 400 may be, e.g., a radio access node (e.g., a radio base station), a core network node (i.e., a node implementing a core network node, entity, or function), or a network node implementing a local or centralized GC server. As illustrated, the network node 400 includes a control system 402 that includes one or more processors 404 (e.g., Central Processing Units (CPUs), Application Specific Integrated Circuits (ASICs), Field Programmable Gate Arrays (FPGAs), and/or the like), memory 406, and a network interface 408. The one or more processors 404 are also referred to herein as processing circuitry. In addition, if the network node 400 is a radio access node, the network node may also include one or more radio units 410 that each includes one or more transmitters 412 and one or more receivers 414 coupled to one or more antennas 416. The radio units 410 may be referred to or be part of radio interface circuitry. In some embodiments, the radio unit(s) 410 is external to the control system 402 and connected to the control system 402 via, e.g., a wired connection (e.g., an optical cable). However, in some other embodiments, the radio unit(s) 410 and potentially the antenna(s) 416 are integrated together with the control system 402. The one or more processors 404 operate to provide one or more functions of a network node 400 (e.g., the functions of a radio base station or local or centralized GC server) as described herein. In some embodiments, the function(s) are implemented in software that is stored, e.g., in the memory 406 and executed by the one or more processors 404.

Figure 5:
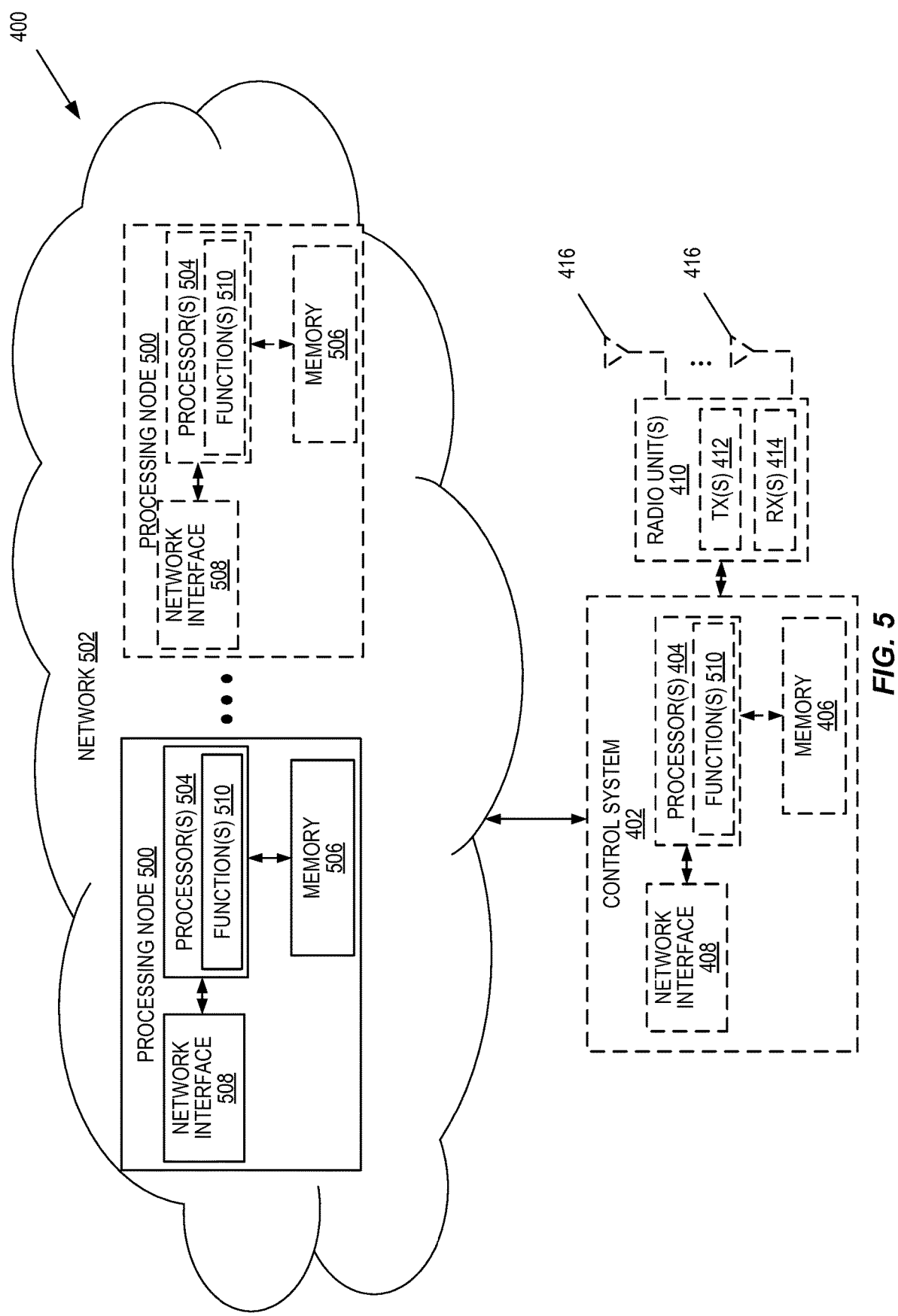
FIG. 5 is a schematic block diagram that illustrates a virtualized embodiment of the network node according to some embodiments of the present disclosure.

FIG. 5 is a schematic block diagram that illustrates a virtualized embodiment of the network node 400 according to some embodiments of the present disclosure. A used herein, a "virtualized" radio access node is an implementation of the radio access node 400 in which at least a portion of the functionality of the network node 400 is implemented as a virtual component(s) (e.g., via a virtual machine(s) executing on a physical processing node(s) in a network(s)). As illustrated, in this example, the network node 400 includes one or more processing nodes 500 coupled to or included as part of a network(s) 502. Each processing node 500 includes one or more processors 504 (e.g., CPUs, ASICs, FPGAs, and/or the like), memory 506, and a network interface 508. In addition, if the network node 400 is a radio access node, the network node 400 further includes the control system 402 (optional) and the one or more radio units 410 coupled to the one or more antennas 416, as described above.

In this example, functions 510 of the network node 400 (e.g., the functions of a radio base station or local or centralized GC server) described herein are implemented at the one or more processing nodes 500 or distributed across the control system 402 and the one or more processing nodes 500 in any desired manner. In some particular embodiments, some or all of the functions 510 of the network node 400 (e.g., the functions of a radio base station or local or centralized GC server) described herein are implemented as virtual components executed by one or more virtual machines implemented in a virtual environment(s) hosted by the processing node(s) 500.

In some embodiments, a computer program including instructions which, when executed by at least one processor, causes the at least one processor to carry out the functionality of network node 400 or a node (e.g., a processing node 500) implementing one or more of the functions 510 of the network node 400 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 6:
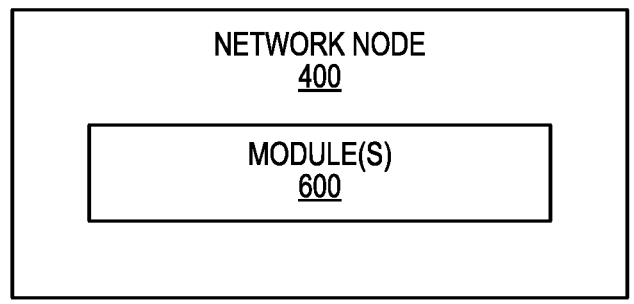
FIG. 6 is a schematic block diagram of the network node according to some other embodiments of the present disclosure.

FIG. 6 is a schematic block diagram of the network node 400 according to some other embodiments of the present disclosure. The network node 400 includes one or more modules 600, each of which is implemented in software. The module(s) 600 provide the functionality of the network node 400 (e.g., the functions of a radio base station or local or centralized GC server) described herein. This discussion is equally applicable to the processing node 500 of FIG. 5 where the modules 600 may be implemented at one of the processing nodes 500 or distributed across multiple processing nodes 500 and/or distributed across the processing node(s) 500 and the control system 402.

Figure 7:
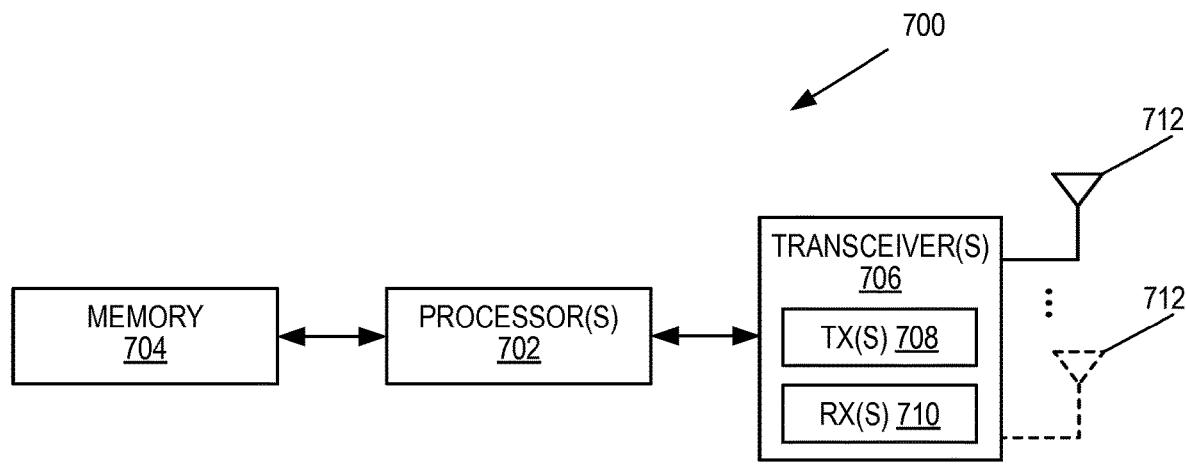
FIG. 7 is a schematic block diagram of a UE according to some embodiments of the present disclosure.

FIG. 7 is a schematic block diagram of a UE 700 according to some embodiments of the present disclosure. As illustrated, the UE 700 includes one or more processors 702 (e.g., CPUs, ASICs, FPGAs, and/or the like), memory 704, and one or more transceivers 706 each including one or more transmitters 708 and one or more receivers 710 coupled to one or more antennas 712. The transceiver(s) 706 includes radio-front end circuitry connected to the antenna(s) 712 that is configured to condition signals communicated between the antenna(s) 712 and the processor(s) 702, as will be appreciated by on of ordinary skill in the art. The processors 702 are also referred to herein as processing circuitry. The transceivers 706 are also referred to herein as radio circuitry. In some embodiments, the functionality of the UE 700 described above may be fully or partially implemented in software that is, e.g., stored in the memory 704 and executed by the processor(s) 702. Note that the UE 700 may include additional components not illustrated in FIG. 7 such as, e.g., one or more user interface components (e.g., an input/output interface including a display, buttons, a touch screen, a microphone, a speaker(s), and/or the like and/or any other components for allowing input of information into the UE 700 and/or allowing output of information from the UE 700), a power supply (e.g., a battery and associated power circuitry), etc.

In some embodiments, a computer program including instructions which, when executed by at least one processor, causes the at least one processor to carry out the functionality of the UE 700 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 8:
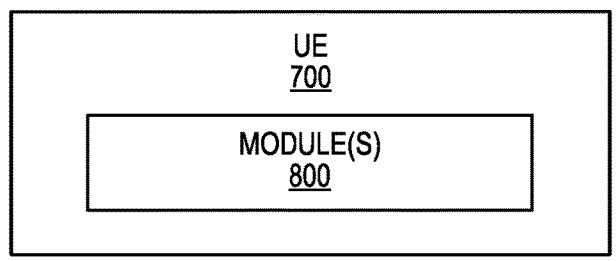
FIG. 8 is a schematic block diagram of the UE according to some other embodiments of the present disclosure.

FIG. 8 is a schematic block diagram of the UE 700 according to some other embodiments of the present disclosure. The UE 700 includes one or more modules 800, each of which is implemented in software. The module(s) 800 provide the functionality of the UE 700 described herein.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein. The steps of any methods disclosed herein do not have to be performed in the exact order disclosed, unless a step is explicitly described as following or preceding another step and/or where it is implicit that a step must follow or precede another step.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Some Embodiments

Some of the embodiments described above may be summarized in the following manner:

1. A method performed by a wireless device for reporting existence of an isolated radio access network, the method comprising:
   performing communications in an isolated radio access network, the isolated radio access network being a radio access network provided by one or more first radio base stations that do not have connectivity to a centralized core network of a cellular communications network;
   attaching to a second radio base station, the second radio base station having connectivity to the core network; and
   providing, to a centralized communications server via the second radio base station, one or more messages that inform the centralized communications server of the existence of the isolated radio access network.
2. The method of embodiment 1 wherein the centralized communications server is a group communications server.
3. The method of embodiment 2 wherein performing communications in the isolated radio access network comprises performing group communications in the isolated radio access network using a local group communications server.
4. The method of any one of embodiments 1 to 3 wherein the isolated radio access network is an isolated cell or a set of isolated cells provided by the one or more first radio base stations.
5. The method of embodiment 4 wherein the isolated cell or each of the set of isolated cells is an Isolated Evolved Universal Terrestrial Radio Access Network, E-UTRAN, Operations for Public Safety, IOPS, cell.
6. The method of any one of embodiments 1 to 5 wherein group communications are provided by the second radio base station and one or more additional radio base stations using Multimedia Broadcast Multicast Services, MBMS, in a Multimedia Broadcast Multicast Service Single Frequency Network, MBSFN.

7. The method of any one of embodiments 1 to 6 wherein at least one of the one or more messages comprises information that indicates how to connect to the one or more first radio base stations and a local (e.g., group) communications server hosted by the one or more first radio base stations.

8. The method of any one of embodiments 1 to 6 wherein at least one of the one or more messages comprises a Public Land Mobile Network, PLMN, Identifier, ID, of the one or more first radio base stations; a frequency band of operation of the one or more first radio base station; and/or a server address of a local (e.g., group) communications server hosted by the one or more first radio base stations.

9. The method of any one of embodiments 1 to 8 wherein at least one of the one or more messages comprises information about group members that are and/or were present in the isolated radio access network, groups supported by the isolated radio access network, and/or active calls (e.g., group communication calls) in the isolated radio access network.

10. The method of any one of embodiments 1 to 9 wherein the isolated radio access network comprises one or more isolated cells, and at least one of the one or more messages comprises one or more cell identities of the one or more isolated cells.

11. The method of any one of embodiments 1 to 10 wherein the isolated radio access network comprises one or more isolated cells, and at least one of the one or more messages comprises information that indicates a physical location of the isolated radio access network.

12. A method performed by a wireless device for reporting existence of an isolated radio access network, the method comprising:
providing, to a centralized communications server via a radio base station, one or more messages that inform the centralized group communications server of the existence of an isolated radio access network.

13. The method of embodiment 12 wherein the centralized communications server is a centralized group communications server.

14. The method of embodiment 12 or 13 wherein the isolated radio access network is one or more isolated cells provided by one or more isolated radio base stations, the one or more isolated radio base stations being one or more base stations that are not connected to a core network of the cellular communications network.

15. The method of embodiment 14 wherein the each of the one or more isolated cells is an Isolated Evolved Universal Terrestrial Radio Access Network, E-UTRAN, Operations for Public Safety, IOPS, cell.

16. The method of any one of embodiments 12 to 15 wherein (e.g., group) communications are provided by the radio base station and one or more additional radio base stations using Multimedia Broadcast Multicast Services, MBMS, in a Multimedia Broadcast Multicast Service Single Frequency Network, MBSFN.

17. The method of any one of embodiments 12 to 16 wherein at least one of the one or more messages comprises information that indicates how to connect to the one or more isolated radio base stations and a local (e.g., group) communications server hosted by the one or more isolated radio base stations.

18. The method of any one of embodiments 12 to 16 wherein at least one of the one or more messages comprises a Public Land Mobile Network, PLMN, Identifier, ID, of the one or more isolated radio base stations; a frequency band of operation of the one or more isolated radio base stations; and/or a server address of a local (e.g., group) communications server hosted by the one or more isolated radio base stations.

19. The method of any one of embodiments 12 to 18 wherein at least one of the one or more messages comprises information about group members that are and/or were present in the isolated radio access network, groups supported by the isolated radio access network, and/or active calls (e.g., group communication calls) in the isolated radio access network.

20. The method of any one of embodiments 12 to 19 wherein the isolated radio access network comprises one or more isolated cells, and at least one of the one or more messages comprises one or more cell identities of the one or more isolated cells.

21. The method of any one of embodiments 12 to 20 wherein the isolated radio access network comprises one or more isolated cells, and at least one of the one or more messages comprises information that indicates a physical location of the isolated radio access network.

22. A method performed by a wireless device for accessing an isolated radio access network, the method comprising:
receiving, from a centralized communications server via a first radio base station of a cellular communications network, one or more messages that inform the wireless device of the existence of an isolated radio access network.

23. The method of claim 22 wherein the centralized communications server is a centralized group communications server.

24. The method of embodiment 22 or 23 wherein (e.g., group) communications is provided by the first radio base station and one or more additional radio base stations using Multimedia Broadcast Multicast Services, MBMS, in a Multimedia Broadcast Multicast Service Single Frequency Network, MBSFN.

25. The method of any one of embodiments 22 to 24 wherein the isolated radio access network is provided by a second radio base station that is not connected to a core network of the cellular communications network.

26. The method of embodiment 25 further comprising:
attaching to the second radio base station; and
performing (e.g., group) communications in the isolated radio access network provided by the second radio base station via a local (e.g., group) communications server hosted by the second radio base station.

27. The method of embodiment 25 or 26 wherein at least one of the one or more messages comprises information that indicates how to connect to the second radio base station and the local (e.g., group) communications server hosted by the second radio base station.

28. The method of embodiment 25 or 26 wherein at least one of the one or more messages comprises a Public Land Mobile Network, PLMN, Identifier, ID, of the second radio base station; a frequency band of operation of the second radio base station; and/or a server address of the local group communications server hosted by the second radio base station.

29. A method performed by a radio base station for (e.g., group) communications services, the method comprising:
    receiving, from a wireless device, one or more messages that inform a centralized (e.g., group) communications server of the existence of an isolated radio access network.
30. The method of embodiment 29 wherein the isolated radio access network is provided by one or more isolated radio base stations, the one or more isolated radio base stations being one or more base stations that are not connected to a core network of the cellular communications network.
31. The method of embodiment 29 wherein the isolated radio access network comprises one or more isolated cells.
32. The method of embodiment 31 wherein each of the one or more isolated cells is an Isolated Evolved Universal Terrestrial Radio Access Network, E-UTRAN, Operations for Public Safety, IOPS, cell.
33. The method of any one of embodiments 30 to 32 wherein at least one of the one or more messages comprises information that indicates how to connect to the one or more isolated radio base stations and a local (e.g., group) communications server hosted by the one or more isolated radio base stations.
34. The method of any one of embodiments 30 to 32 wherein at least one of the one or more messages comprises a Public Land Mobile Network, PLMN, Identifier, ID, of the one or more isolated radio base stations; a frequency band of operation of the one or more isolated radio base stations; and/or a server address of a local (e.g., group) communications server hosted by the one or more isolated radio base stations.
35. The method of any one of embodiments 29 to 34 wherein at least one of the one or more messages comprises information about group members that are and/or were present in the isolated radio access network, groups supported by the isolated radio access network, and/or active calls (e.g., group communication calls) in the isolated radio access network.
36. The method of any one of embodiments 29 to 35 wherein the isolated radio access network comprises one or more isolated cells, and at least one of the one or more messages comprises one or more cell identities of the one or more isolated cells.
37. The method of any one of embodiments 29 to 36 wherein the isolated radio access network comprises one or more isolated cells, and at least one of the one or more messages comprises information that indicates a physical location of the isolated radio access network.
38. The method of any one of embodiments 29 to 37 further comprising performing one or more actions based on at least one of the one or more messages.
39. The method of embodiment 38 wherein (e.g., group) communications is provided by the radio base station and one or more additional radio base stations using Multimedia Broadcast Multicast Services, MBMS, in a Multimedia Broadcast Multicast Service Single Frequency Network, MBSFN.
40. The method of embodiment 39 wherein the one or more actions comprise adapting a modulation and coding scheme in the MBSFN to account for interference from the isolated radio access network.
41. The method of any one of embodiments 29 to 40 further comprising sending, to a second wireless device, one or more messages that inform the second wireless device of the existence of the isolated radio access network.
42. The method of embodiment 41 wherein at least one of the one or more messages sent to the second wireless device comprises information that indicates how to connect to the one or more isolated radio base stations that provide the isolated radio access network and a local (e.g., group) communications server hosted by the one or more isolated radio base stations.
43. The method of embodiment 41 wherein at least one of the one or more messages sent to the second wireless device comprises a Public Land Mobile Network, PLMN, Identifier, ID, of the one or more isolated radio base stations that provide the isolated radio access network; a frequency band of operation of the one or more isolated radio base stations; and/or a server address of the local (e.g., group communications server hosted by the one or more isolated radio base stations.
44. A wireless device adapted to perform the method of any one of embodiments 1 to 28.
45. A radio base station adapted to perform the method of any one of embodiments 29 to 43.

Abbreviations

At least some of the following abbreviations may be used in this disclosure. If there is an inconsistency between abbreviations, preference should be given to how it is used above. If listed multiple times below, the first listing should be preferred over any subsequent listing(s).
3GPP Third Generation Partnership Project
5G Fifth Generation
AP Access Point
ASIC Application Specific Integrated Circuit
CPU Central Processing Unit
DMO Direct Mode Operation
DSP Digital Signal Processor
eNB Enhanced or Evolved Node B
E-UTRAN Evolved Universal Terrestrial Radio Access Network
FPGA Field Programmable Gate Array
GC Group Communication
gNB New Radio Base Station
ID Identifier
IPOS Isolated Evolved Universal Terrestrial Radio Access Network Operations for Public Safety
LTE Long Term Evolution
MBMS Multimedia Broadcast Multicast Services
MBSFN Multimedia Broadcast Multicast Service Single Frequency Network
MC Mission Critical
MCPTT Mission Critical Push to Talk
MME Mobility Management Entity
MTC Machine Type Communication
NR New Radio
OTT Over-the-Top
P-GW Packet Data Network Gateway
PLMN Public Land Mobile Network
PTT Push to Talk
RAM Random Access Memory
ROM Read Only Memory
RRH Remote Radio Head
SCEF Service Capability Exposure Function
SINR Signal to Interference plus Noise Ratio
TMO Trunked Mode Operation
TS Technical Specification
UE User Equipment

The invention claimed is:

1. A method performed by a wireless device for reporting existence of an isolated radio access network, the method comprising:
performing communications in an isolated radio access network, the isolated radio access network being a radio access network provided by one or more first radio base stations that do not have connectivity to a centralized core network of a cellular communications network;
attaching to a second radio base station, the second radio base station having connectivity to the core network; and
providing, to a centralized communications server via the second radio base station, one or more messages that inform the centralized communications server of the existence of the isolated radio access network.

2. The method of claim 1 wherein the centralized communications server is a group communications server.

3. The method of claim 1 wherein the isolated radio access network is an isolated cell or a set of isolated cells provided by the one or more first radio base stations.

4. The method of claim 1 wherein group communications are provided by the second radio base station and one or more additional radio base stations using Multimedia Broadcast Multicast Services, MBMS, in a Multimedia Broadcast Multicast Service Single Frequency Network, MBSFN.

5. The method of claim 1 wherein at least one of the one or more messages comprises information that indicates how to connect to the one or more first radio base stations and a local (e.g., group) communications server hosted by the one or more first radio base stations.

6. The method of claim 1 wherein at least one of the one or more messages comprises a Public Land Mobile Network, PLMN, Identifier, ID, of the one or more first radio base stations; a frequency band of operation of the one or more first radio base station; and/or a server address of a local (e.g., group) communications server hosted by the one or more first radio base stations.

7. The method of claim 1 wherein at least one of the one or more messages comprises information about group members that are and/or were present in the isolated radio access network, groups supported by the isolated radio access network, and/or active calls (e.g., group communication calls) in the isolated radio access network.

8. The method of claim 1 wherein the isolated radio access network comprises one or more isolated cells, and at least one of the one or more messages comprises at least one of: one or more cell identities of the one or more isolated cells, or information that indicates a physical location of the isolated radio access network.

9. A method performed by a wireless device for reporting existence of an isolated radio access network, the method comprising:
providing, to a centralized communications server via a radio base station, one or more messages that inform the centralized group communications server of the existence of an isolated radio access network, wherein at least one of the one or more messages comprises information that indicates how to connect to the one or more isolated radio base stations and a local (e.g., group) communications server hosted by the one or more isolated radio base stations.

10. The method of claim 9 wherein the centralized communications server is a centralized group communications server.

11. The method of claim 9 wherein the isolated radio access network is one or more isolated cells provided by one or more isolated radio base stations, the one or more isolated radio base stations being one or more base stations that are not connected to a core network of the cellular communications network.

12. The method of claim 9 wherein at least one of the one or more messages comprises a Public Land Mobile Network, PLMN, Identifier, ID, of the one or more isolated radio base stations; a frequency band of operation of the one or more isolated radio base stations; and/or a server address of a local (e.g., group) communications server hosted by the one or more isolated radio base stations.

13. The method of claim 9 wherein at least one of the one or more messages comprises information about group members that are and/or were present in the isolated radio access network, groups supported by the isolated radio access network, and/or active calls (e.g., group communication calls) in the isolated radio access network.

14. The method of claim 9 wherein the isolated radio access network comprises one or more isolated cells, and at least one of the one or more messages comprises one or more cell identities of the one or more isolated cells.

15. A method performed by a wireless device for accessing an isolated radio access network, the method comprising:
receiving, from a centralized communications server via a first radio base station of a cellular communications network, one or more messages that inform the wireless device of the existence of an isolated radio access network, wherein the isolated radio access network is provided by a second radio base station that is not connected to a core network of the cellular communications network, and wherein at least one of the one or more messages comprises information that indicates how to connect to the second radio base station and the local (e.g., group) communications server hosted by the second radio base station.

16. The method of claim 15 wherein the centralized communications server is a centralized group communications server.

17. The method of claim 15 further comprising: attaching to the second radio base station; and performing (e.g., group) communications in the isolated radio access network provided by the second radio base station via a local (e.g., group) communications server hosted by the second radio base station.

18. The method of claim 15 wherein at least one of the one or more messages comprises a Public Land Mobile Network, PLMN, Identifier, ID, of the second radio base station; a frequency band of operation of the second radio base station; and/or a server address of the local group communications server hosted by the second radio base station.

19. A method performed by a radio base station for (e.g., group) communications services, the method comprising:
receiving, from a wireless device, one or more messages that inform a centralized (e.g., group) communications server of the existence of an isolated radio access network, wherein the isolated radio access network is provided by one or more isolated radio base stations, the one or more isolated radio base stations being one or more base stations that are not connected to a core network of the cellular communications network, and wherein at least one of the one or more messages comprises information that indicates how to connect to the one or more isolated radio base stations and a local (e.g., group) communications server hosted by the one or more isolated radio base stations.

20. The method of claim 19 wherein at least one of the one or more messages comprises a Public Land Mobile Network, PLMN, Identifier, ID, of the one or more isolated radio base stations; a frequency band of operation of the one or more isolated radio base stations; and/or a server address of a local (e.g., group) communications server hosted by the one or more isolated radio base stations.

21. The method of claim 19 wherein at least one of the one or more messages comprises information about group members that are and/or were present in the isolated radio access network, groups supported by the isolated radio access network, and/or active calls (e.g., group communication calls) in the isolated radio access network.

22. The method of claim 19 wherein the isolated radio access network comprises one or more isolated cells, and at least one of the one or more messages comprises one or more cell identities of the one or more isolated cells.

23. The method of claim 19 comprising sending, to a second wireless device, one or more messages that inform the second wireless device of the existence of the isolated radio access network.

24. The method of claim 23 wherein at least one of the one or more messages sent to the second wireless device comprises information that indicates how to connect to the one or more isolated radio base stations that provide the isolated radio access network and a local (e.g., group) communications server hosted by the one or more isolated radio base stations.

25. The method of claim 23 wherein at least one of the one or more messages sent to the second wireless device comprises a Public Land Mobile Network, PLMN, Identifier, ID, of the one or more isolated radio base stations that provide the isolated radio access network; a frequency band of operation of the one or more isolated radio base stations; and/or a server address of the local (e.g., group) communications server hosted by the one or more isolated radio base stations.

26. A wireless device for reporting existence of an isolated radio access network, the wireless device adapted to:
perform communications in an isolated radio access network, the isolated radio access network being a radio access network provided by one or more first radio base stations that do not have connectivity to a centralized core network of a cellular communications network;
attach to a second radio base station, the second radio base station having connectivity to the core network; and
provide, to a centralized communications server via the second radio base station, one or more messages that inform the centralized communications server of the existence of the isolated radio access network.

27. A radio base station for (e.g., group) communications services, the radio base station adapted to:
receive, from a wireless device, one or more messages that inform a centralized (e.g., group) communications server of the existence of an isolated radio access network, wherein the isolated radio access network is provided by one or more isolated radio base stations, the one or more isolated radio base stations being one or more base stations that are not connected to a core network of the cellular communications network, and wherein at least one of the one or more messages comprises information that indicates how to connect to the one or more isolated radio base stations and a local (e.g., group) communications server hosted by the one or more isolated radio base stations.

* * * * *